(12) United States Patent
Trajković

(10) Patent No.: US 7,031,497 B2
(45) Date of Patent: Apr. 18, 2006

(54) METHOD FOR COMPUTING OPTICAL FLOW UNDER THE EPIPOLAR CONSTRAINT

(75) Inventor: Miroslav Trajković, Ossining, NY (US)

(73) Assignee: Koninklijke Philips Electronics N.V., Eindhoven (NL)

(*) Notice: Subject to any disclaimer, the term of this patent is extended or adjusted under 35 U.S.C. 154(b) by 845 days.

(21) Appl. No.: 09/993,061

(22) Filed: Nov. 5, 2001

(65) Prior Publication Data

US 2003/0086590 A1    May 8, 2003

(51) Int. Cl.
*G06K 9/00* (2006.01)

(52) U.S. Cl. ........................ 382/107; 348/154

(58) Field of Classification Search ............... 382/107, 382/103, 154, 106, 228, 236, 243, 247, 253, 382/287, 289, 294, 203; 73/488; 348/154–155; 356/27
See application file for complete search history.

(56) References Cited

U.S. PATENT DOCUMENTS

| | | | | |
|---|---|---|---|---|
| 5,500,904 A | * | 3/1996 | Markandey et al. | 382/103 |
| 6,011,863 A | * | 1/2000 | Roy | 382/154 |
| 6,137,419 A | * | 10/2000 | Lennox et al. | 340/687 |
| 6,192,145 B1 | * | 2/2001 | Anandan et al. | 382/154 |
| 6,307,959 B1 | * | 10/2001 | Mandelbaum et al. | 382/154 |
| 6,353,678 B1 | * | 3/2002 | Guo et al. | 382/154 |
| 6,452,637 B1 | * | 9/2002 | Rudin et al. | 348/416.1 |
| 6,473,536 B1 | * | 10/2002 | Chiba et al. | 382/284 |
| 6,574,494 B1 | * | 6/2003 | Van Horn | 600/407 |
| 6,614,429 B1 | * | 9/2003 | Zhang et al. | 345/420 |
| 6,661,913 B1 | * | 12/2003 | Zhang et al. | 382/154 |
| 6,693,666 B1 | * | 2/2004 | Baker et al. | 348/219.1 |
| 6,771,810 B1 | * | 8/2004 | Zhang et al. | 382/154 |
| 6,807,290 B1 | * | 10/2004 | Liu et al. | 382/118 |
| 6,931,150 B1 | * | 8/2005 | Zhang et al. | 382/154 |
| 2002/0061131 A1 | * | 5/2002 | Sawhney et al. | 382/154 |
| 2003/0035592 A1 | * | 2/2003 | Cornog et al. | 382/284 |
| 2003/0052963 A1 | * | 3/2003 | Junkins et al. | 348/14.01 |
| 2003/0052965 A1 | * | 3/2003 | Junkins et al. | 348/42 |
| 2004/0071367 A1 | * | 4/2004 | Irani et al. | 382/284 |
| 2004/0091170 A1 | * | 5/2004 | Cornog et al. | 382/276 |

OTHER PUBLICATIONS

Oisel et al: "Epipolar Constrained Motion Estimation for Reconstruction from Video Sequences" SPIE Conference On Visual Communications And Image Processing VCIP '98, vol. 3309, Jan. 1998, pp. 301-309.

Criminisi et al "An Integrated Neural and Algorithmic System for Optical Flow Computation" Proc. Of The Sixth International Conference On Artificial Intelligence And Information-Control Systems Of Robots Wirn Vietre-96, May 23-25, 1996, pp. 304-309.

\* cited by examiner

*Primary Examiner*—Barry Choobin
(74) *Attorney, Agent, or Firm*—Michael E. Belk

(57) ABSTRACT

Point matches between images within an image sequence are identified by sparse optical flow computation and employed to compute a fundamental matrix for the epipolar geometry, which in turn is employed to derive an epipolar geometry constraint for computing dense optical flow for the image sequence. The epipolar geometry constraint may further be combined with local, heuristic constraints or robust statistical methods. Improvements in both accuracy and performance in computing optical flow are achieved utilizing the epipolar geometry constraint.

23 Claims, 4 Drawing Sheets

METHOD FOR COMPUTING OPTICAL FLOW UNDER THE EPIPOLAR CONSTRAINT

TECHNICAL FIELD OF THE INVENTION

The present invention is directed, in general, to processing an image sequence for modeling of the content or modification of a perspective for the scene within the image sequence and, more specifically, to computing optical flow by imposing a global, non-heuristic, geometrical constraint, either alone or in combination with heuristic constraints.

BACKGROUND OF THE INVENTION

For consecutive image sequences such as found in video presentations, optical flow is the velocity field which warps one image into another (usually very similar) image. Optical flow is computed using the well-known optical flow equation:

$$I_x u + I_y v + I_t = 0 \quad (1)$$

where $I_x$, $I_y$, and $I_t$ represent the spatio-temporal derivatives of image intensity (all known) at a given point A and (u,v) represents the (unknown) image velocity across an image sequence at the same point. The system defined by equation (1) is obviously unconstrained since at least one more constraint is required to uniquely solve for image velocity (u,v). It should be noted that equation (1) defines a line in (u,v) space, as illustrated in FIG. 5A.

A variety of methods have been employed or proposed for determining the second constraint required for unique solution of the system of equation (1). However, a common feature of the many different methods for introducing the second constraint is that the second constraint is local and heuristic. For example, one technique assumes the image velocity (u,v) is locally uniform and determines the velocity by minimizing the total error in point A by, for example, finding the image velocity (u,v) which minimizes the expression:

$$\sum_\Omega (I_x u + I_y v + I_t)^2 \quad (2)$$

where $\Omega$ denotes the region over which the image velocity is assumed constant. A geometric interpretation of this (least squares) minimization problem is illustrated in FIG. 5B. Basically, the vector (u,v) is found as a point with the minimum total distance from lines $I_1, I_2, I_3, \ldots, I_n$.

The main disadvantages of this method are: (1) since the image velocity is computed for each point, the method is computationally expensive; and (2) if the image velocity or variation between sequential images is low (i.e., $I_x \approx I_y \approx 0$), the image velocity either can not be determined or is very sensitive to noise. Additionally, special problems arise in the presence of strong noise and/or multiple motions present in the vicinity of image point (x,y), as illustrated in FIG. 5C.

To overcome these disadvantages, a class of methods referred to as "sparse optical flow" computation has been introduced. Such methods are typically performed utilizing two steps: (1) find points in the image with high information content (typically, high variation in $I_x$, $I_y$); and (2) compute optical flow at those points utilizing point matching between consecutive image frames (the phrases "sparse optical flow" and "point matches" will be used interchangeably herein). While these methods are faster and more reliable than "dense" optical flow methods, the disadvantage is that the optical flow is computed only at a small number of points.

There is, therefore, a need in the art for a method of combining the benefits of both dense and sparse optical flow without incurring the respective disadvantages.

SUMMARY OF THE INVENTION

To address the above-discussed deficiencies of the prior art, it is a primary object of the present invention to provide, for use in video system, a method of computing optical flow for an image sequence by imposing a global, non-heuristic, geometrical constraint. Point matches between images within the image sequence are identified by sparse optical flow computation and employed to compute a fundamental matrix for the epipolar geometry, which in turn is employed to derive an epipolar geometry constraint for computing dense optical flow for the image sequence. The epipolar geometry constraint may further be combined with local, heuristic constraints or robust statistical methods. Improvements in both accuracy and performance in computing optical flow are achieved utilizing the epipolar geometry constraint.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
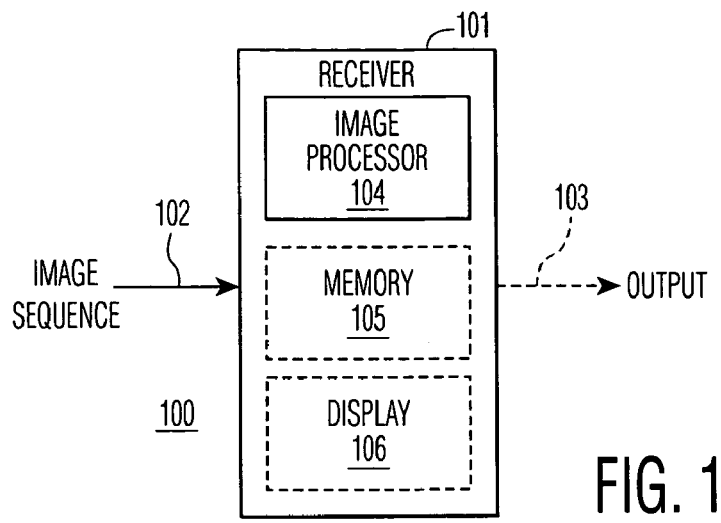
FIG. 1 depicts a block diagram of a video system employing a method of computing optical flow under an epipolar geometry constraint according to one embodiment of the present invention.

FIG. 1 depicts a block diagram of a video system employing a method of computing optical flow under an epipolar geometry constraint according to one embodiment of the present invention. Video system 100 includes a video receiver, which may be a computer or other data processing system; a satellite, terrestrial or cable broadcast television receiver; a set top box; or a video game unit. Video receiver 101 has an input 103 for receiving a sequence of images and an optional output 104 for transmitting processed image data to, for example, a display or recording device.

Video receiver 101 in the exemplary embodiment includes an image processor 104 computing optical flow for the received sequence of images as described in further detail below. Video receiver 101 may also optionally include a memory 105 for storing the received sequence of images, computed optical flow information, or other data, and a display 106 for displaying images or image sequences modified utilizing the computed optical flow information. For example, image processor may be employed in depth reconstruction, body modeling, or image morphing for three dimensional (3D) television, and may generate altered image sequences based on received image sequences to display a scene from a different perspective.

Those skilled in the art will recognize that the complete structure and operation of a video receiver is not depicted or described herein. Instead, only so much of the structure and operation of a video receiver as is either unique to the present invention or necessary for an understanding of the present invention is depicted in the figures and described. The remainder of the structure and operation of a suitable video receiver may be conventional, although in the present invention the video receiver computes optical flow information for the received image sequence as described in further detail below.

Figure 2:
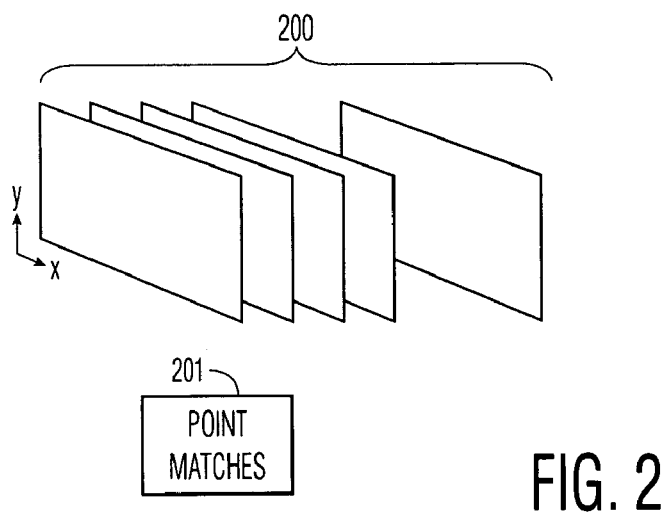
FIG. 2 depicts image data employed in computing optical flow under an epipolar geometry constraint according to one embodiment of the present invention.

FIG. 2 depicts image data employed in computing optical flow under an epipolar geometry constraint according to one embodiment of the present invention. In computing optical flow according to the present invention, video receiver 101 receives a sequence of images 200, and either receives or computes (using, e.g., image processor 104) a tabulation 201 of point matches, corresponding image pixels, between images within the sequence.

In the present invention, optical flow for the received sequence of images 200 is computed by first performing the sparse optical flow computation described above. That is, the points in the image(s) with the richest information content (e.g., high variation in $I_x$, $I_y$, such as corners) are identified and matched between images within the sequence. The identified point matches are then employed to compute the epipolar geometry relating the views between consecutive frames, described by a fundamental matrix F. Normally at least seven point matches are required to compute the fundamental matrix F relating all pixels within two images for the image sequence.

Figure 5A:
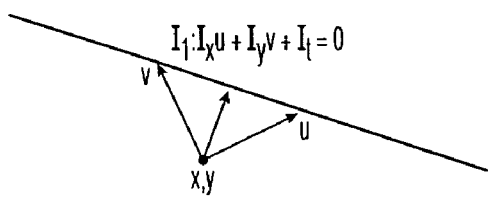
FIGS. 5A through 5C are geometric interpretations of various optical flow problems.
Figure 5B:
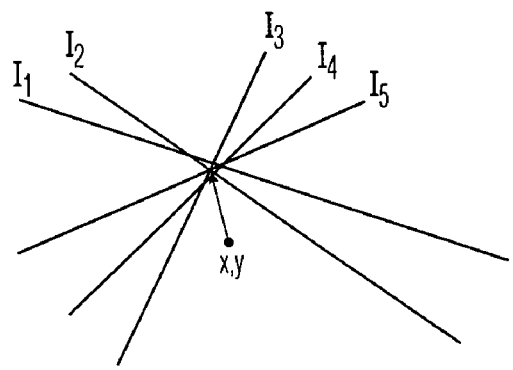
Figure 5C:
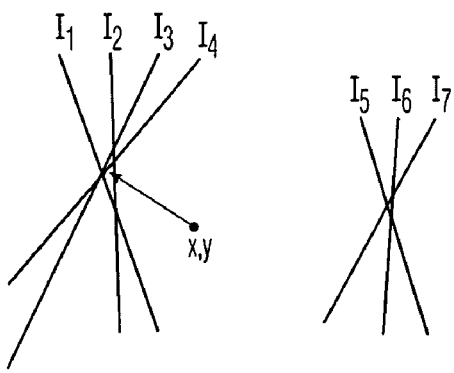
Figure 5D:
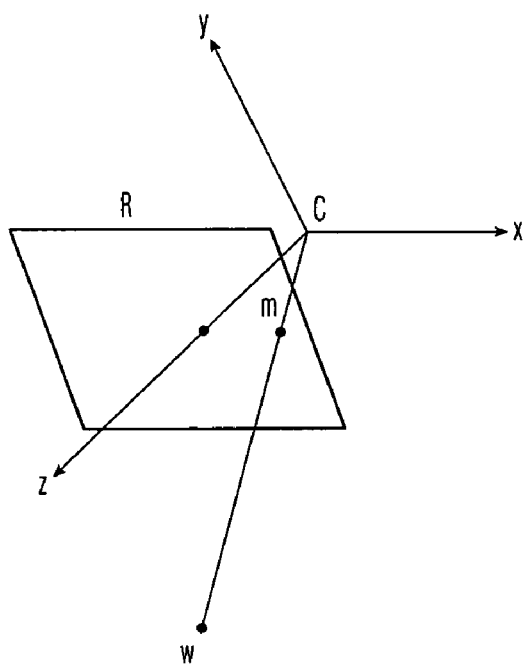
FIGS. 5D and 5E depict models for computing epipolar geometry.
Figure 5E:
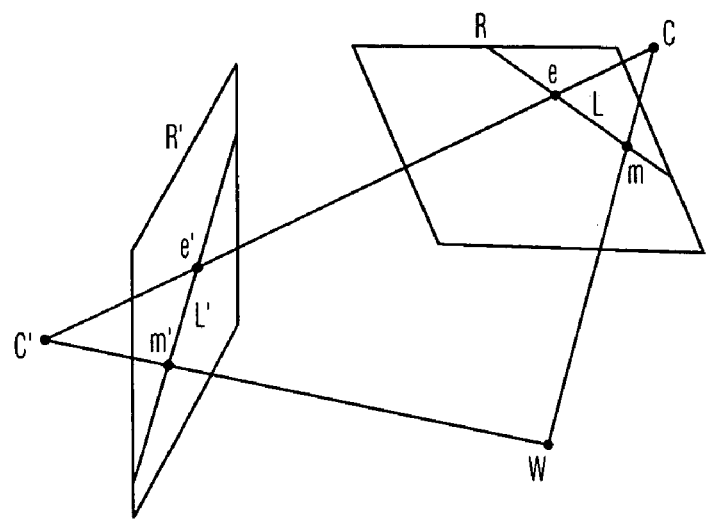

In computing the fundamental matrix, a pinhole camera model illustrated in FIG. 5D is employed for the first view/frame to define the location within the camera reference frame (x, y, and z, where z is the optical axis) of an image point m representing the intersection of a line containing a three dimensional world point W and the camera's optical center C with an image plane R. The projection of the optical center C' for a similar pinhole camera representing the second view/frame onto the image plane R of the first camera or view/frame, illustrated in FIG. 5E, is epipole e, and epipole e' is similarly the projection of the optical center C onto the image plane R' of the second camera or view/frame. The image points m (defined by coordinates x,y) and m' (defined by coordinates x',y'), which represent the projection of the world point W onto the image planes R and R', respectively, constitute a conjugate pair, and a fundamental matrix F relating such conjugate pairs may be computed from at least seven image point matches, in accordance with the known art (see, e.g., "Epipolar Geometry and the Fundamental Matrix" in R. Hartley & A. Zisserman, Multiple View Geometry in Computer Vision pp. 219–242 (Cambridge University Press 2000), incorporated herein by reference). Additionally, epipoles e and e' and image point m form a plane, for which the intersection with image plane R is epipolar line L; similarly, epipoles e and e' and image point m' form a plane, for which the intersection with image plane R' is epipolar line L'.

Referring back to FIG. 2, the fundamental matrix F imposes a global constraint on point matches (x,y) and (x',y') given by:

$$[x \ y \ 1] F \begin{bmatrix} x' \\ y' \\ 1 \end{bmatrix} = 0. \qquad (3)$$

The geometric interpretation of this constraint is that the point matches (x',y') for the point at coordinates (x,y) must lie on the epipolar line L'. By substituting x'=x+u and y'=y+v, equation (3) may be written as:

$$a_{x,y} u + b_{x,y} v + c_{x,y} = 0 \qquad (4)$$

where $a_{x,y}$, $b_{x,y}$ and $c_{x,y}$ (or, alternatively, simply a, b and c) are obtained from the fundamental matrix F and point coordinates (x,y). Optical flow may therefore be calculated from the combination of equations (1) and (4). Since both equations are linear, optical flow is completely determined. Dense optical flow (i.e., optical flow at each pixel location within at least one of the two images) is therefore easily computed utilizing the epipolar geometry constraint of equation (4) in combination with the basic optical flow equation (1).

In addition, the epipolar geometry constraint defined by equation (4) may be utilized to improve computation of optical flow by any known methods, including, for example, the minimization method described above. Combining equations (2) and (4), optical flow may be computed by minimizing, in u, the expression:

$$\sum_{x,y \in \Omega} ((bI_x - aI_y)u + cI_y - bI_t)^2$$

and then finding v as:

$$v = \frac{c - au}{b}.$$

Another example of the usefulness of the epipolar geometry constraint involves computation of optical flow utilizing robust statistics. Referring back to the geometric interpretations of equations (1) and (2) illustrated in FIGS. 5A through 5C, the problems arising from the presence of strong noise and/or multiple motions in the vicinity of point (x,y) prevent effective use of the least squares minimization method to obtain the motion vector (u,v). Robust statistical methods, such as Least Median of Squares (LMedS), RANdom SAmple Consensus (RANSAC), etc., are required. However, such robust statistical methods are typically exponential in the size of the search space and, in general, are not easy to implement for a search space size greater than one. Computation of optical flow involves a search space size of two, namely u and v.

Figure 3:
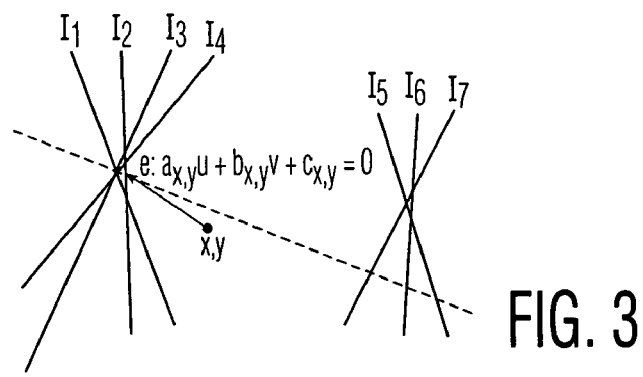
FIG. 3 illustrates a geometric interpretation of computing optical flow in the presence of strong noise and/or multiple motions in the vicinity of the subject image point utilizing robust statistical methods under an epipolar geometry constraint according to one embodiment of the present invention.

FIG. 3 illustrates a geometric interpretation of computing optical flow in the presence of strong noise and/or multiple motions in the vicinity of the subject image point utilizing robust statistical methods under an epipolar geometry constraint according to one embodiment of the present invention. By imposing the epipolar geometry constraint of equation (4), optical flow vectors (u,v) are determined by the intersection between the optical flow constraint lines $I_1, I_2, I_3, \ldots, I_n$ and the epipolar line defined by equation (4). Optical flow is thus easily determined utilizing robust statistical methods such as, for instance, Least Median of Squares by: (1) finding, for each line $I_i$, the intersection $(u_i, v_i)$ of the respective line with the epipolar line e; finding the horizontal (or vertical, or any other parameterization) component of the optical flow vector (as $u = \underset{i=1,\ldots,n}{\mathrm{median}}(u_i)$ for Least Median of Squares); and then finding the vertical component of the optical flow vector as $$v = \frac{c - au}{b}.$$

The above discussions assume that no motion relative to an image frame of reference is occurring by objects within the image, and that motion is due only to camera or view movement. However, if the images contain moving objects (the validity of the computed fundamental matrix may be assumed to be accurate despite such motion if the image is dominated by the stationary background to the moving objects since robust statistical methods known in the art may be utilized in such cases), similarity of pixels which should match based on the derived optical flow may be evaluated, and each pixel assigned a confidence level. Pixels associated with moving objects in such a situation will receive low confidence levels, while pixels relating to the background will receive high confidence levels. Pixels having a high confidence level may then be disregarded, and the remaining pixels (assumed to relate to moving objects) employed to compute a separate epipolar geometry for computing dense optical flow for those pixels.

Figure 4:
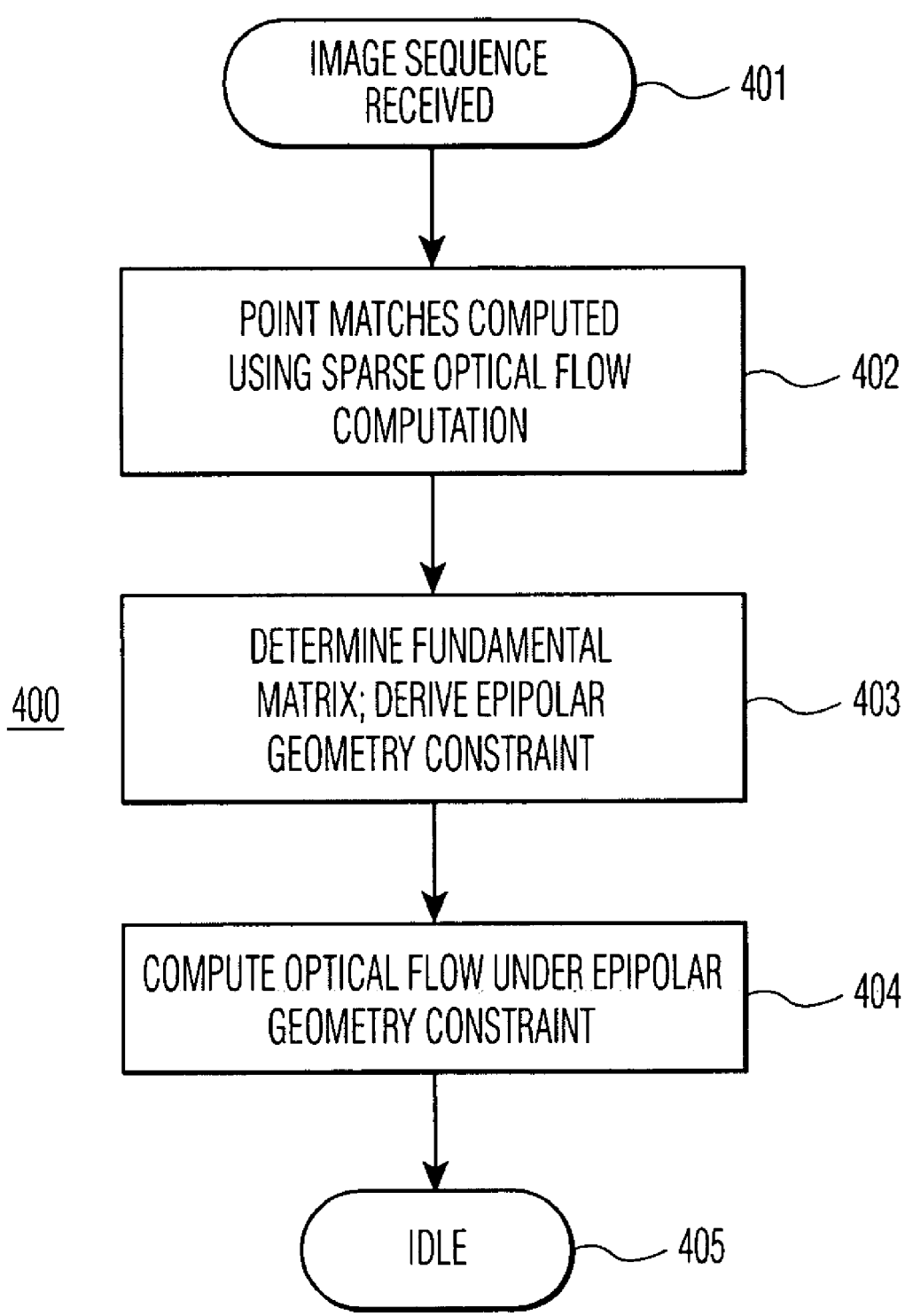
FIG. 4 is a high level flowchart for a process of computing optical flow under an epipolar geometry constraint according to one embodiment of the present invention.

FIG. 4 is a high level flowchart for a process of computing optical flow under an epipolar geometry constraint according to one embodiment of the present invention. The process 400 begins with receipt of an image sequence (step 401) for which optical flow information is needed. Point matches between images within the image sequence are first computed utilizing sparse optical flow computation (step 402), and are employed to determine the fundamental matrix of correlation between images within the image sequence (step 403).

The fundamental matrix, in turn, is employed to derive an epipolar geometry constraint for optical flow computation, and optical flow is computed for each pixel within at least one of the image under the epipolar geometry constraint (step 404). Computation of optical flow under the epipolar geometry constraint may also involve use of local, heuristic constraints such as least squares minimization or robust statistical methods. The process then becomes idle (step 405) until another image sequence is received for computation of optical flow information.

The present invention computes optical flow by imposing a global, non-heuristic, geometrical constraint derived from epipolar geometry for the underlying image sequence on the basic optical flow equation. The epipolar geometry constraint may be combined with heuristic constraints. In any event, improved accuracy and performance in computation of the optical flow vector is achieved.

It is important to note that while the present invention has been described in the context of a fully functional system, those skilled in the art will appreciate that at least portions of the mechanism of the present invention are capable of being distributed in the form of a machine usable medium containing instructions in a variety of forms, and that the present invention applies equally regardless of the particular type of signal bearing medium utilized to actually carry out the distribution. Examples of machine usable mediums include: nonvolatile, hard-coded type mediums such as read only memories (ROMs) or erasable, electrically programmable read only memories (EEPROMs), recordable type mediums such as floppy disks, hard disk drives and compact disc read only memories (CD-ROMs) or digital versatile discs (DVDs), and transmission type mediums such as digital and analog communication links.

Although the present invention has been described in detail, those skilled in the art will understand that various changes, substitutions, variations, enhancements, nuances, gradations, lesser forms, alterations, revisions, improvements and knock-offs of the invention disclosed herein may be made without departing from the spirit and scope of the invention in its broadest form.

What is claimed is:

1. A system for computing optical flow between images within an image sequence comprising:
    an image processor processing the image sequence, wherein the image processor: derives epipolar geometry for the images from point matches between the images; and computes optical flow for each pixel within at least one of the images under a constraint derived from the epipolar geometry by computing a component of the optical flow using a median.

2. The system according to claim 1, wherein the image processor, in deriving the epipolar geometry for the images, computes sparse optical flow between the images.

3. The system according to claim 1, wherein the image processor, in computing optical flow for each pixel within at least one of the images, employs a constraint derived from a fundamental matrix between the images.

4. The system according to claim 1, wherein the image processor utilizes the constraint derived from the epipolar geometry in combination with least squares minimization to compute optical flow for each pixel within at least one of the images.

5. The system according to claim 1, wherein the image processor utilizes the constraint derived from the epipolar geometry in combination with robust statistical methods to compute optical flow for each pixel within at least one of the images.

6. The system according to claim 1, wherein the image processor computes optical flow u,v for each pixel within at least one of the images from $I_x u + I_y v + I_t = 0$, where $I_x$, $I_y$, and $I_t$ are known spatio-temporal derivatives of image intensity at each pixel within the at least one image, and $a_{x,y} u + b_{x,y} v + c_{x,y} = 0$, where $a_{x,y}$, $b_{x,y}$ and $c_{x,y}$ are derived from a fundamental matrix F between the images.

7. The system according to claim 1, wherein the image processor computes dense optical flow between the images.

8. A system for computing optical flow between images within an image sequence comprising:
a video receiver including an input for receiving the image sequence;
an image processor within the video system processing the image sequence, wherein the image processor:
derives epipolar geometry forte images from point matches between the images; and
computes optical flow for each pixel within at least one of the images under a constraint derived from the epipolar geometry by computing a component of the optical disc flow using a median.

9. The system according to claim 8, wherein the image processor, in deriving the epipolar geometry for the images, computes sparse optical flow between the images.

10. The system according to claim 8, wherein the image processor, in computing optical flow for each pixel within at least one of the images, employs a constraint derived from a fundamental matrix between the images.

11. The system according to claim 8, wherein the image processor utilizes the constraint derived from the epipolar geometry in combination with least squares minimization to compute optical flow for each pixel within at least one of the images.

12. The system according to claim 8, wherein the image processor utilizes the constraint derived from the epipolar geometry in combination with robust statistical methods to compute optical flow for each pixel within at least one of the images.

13. The system according to claim 8, wherein the image processor computes optical flow u,v for each pixel within at least one of the images from $I_x u + I_y v + I_t = 0$, where $I_x$, $I_y$, and $I_t$ are known spatio-temporal derivatives of image intensity at each pixel within the at least one image, and $a_{x,y} u + b_{x,y} v + c_{x,y} = 0$, where $a_{x,y}$, $b_{x,y}$ and $c_{x,y}$ are derived from a fundamental matrix F between the images.

14. The system according to claim 8, wherein the image processor computes dense optical flow between the images.

15. A method for computing optical flow between images within an image sequence comprising:
deriving epipolar geometry for the images from point matches between the images; and
computing optical flow for each pixel within at least one of the images under a constraint derived from the epipolar geometry by computing a component of the optical flow using a median.

16. The method according to claim 15, wherein the step of deriving the epipolar geometry for the images from point matches between the images further comprises: computing sparse optical flow between the images.

17. The method according to claim 15, wherein the step of computing optical flow for each pixel within at least one of the images under a constraint derived from the epipolar geometry further comprises: computing optical flow employing a constraint derived from a fundamental matrix between the images.

18. The method according to claim 15, wherein the step of computing optical how for each pixel within at least one of the images under a constraint derived from the epipolar geometry further comprises: utilizing the constraint derived from the epipolar geometry in combination with least squares minimization to compute optical flow for each pixel within at least one of the images.

19. The method according to claim 15, wherein the stop of computing optical flow for each pixel within at least one of the images under a constraint derived from the epipolar geometry further comprises: utilizing the constraint derived from the epipolar geometry in combination with robust statistical methods to compute optical flow far each pixel within at least one of the images.

20. The method according to claim 1, wherein the step of computing optical flow for each pixel within at least one of the images under a constraint derived from the epipolar geometry further comprises:
computing optical flow u,v for each pixel within at least one of the images from $I_x u + I_y v + I_t = 0$, where $I_x$, $I_y$, and $I_t$ are known spatio-temporal derivatives of image intensity at each pixel within the at least one image, and $a_{x,y} u + b_{x,y} v + c_{x,y} = 0$, where $a_{x,y}$, $b_{x,y}$ and $c_{x,y}$ are derived from a fundamental matrix F between the images.

21. The system of claim 1, wherein the computation of the optical flow comprises of:
u=median $(u_i)$
i=1, . . . ,n
where u is a component of the optical flow vector and n is the number of optical flow constraint lines.

22. The system of claim 8, wherein the computation of the optical flow comprises of:
u=median $(u_i)$
i=1, . . . ,n
where u is a component of the optical flow vector and n is the number of optical flow constraint lines.

23. The system of claim 15, wherein the computation of the optical flow comprises of:
u=median $(u_i)$
i=1, . . . ,n
where u is a component of the optical flow vector and n is the number of optical flow constraint lines.

* * * * *